March 28, 1961  V. WEBER ET AL  2,977,452
CAPACITANCE TYPE TEMPERATURE CONTROL
Filed Dec. 16, 1957  3 Sheets-Sheet 1

INVENTORS.
Victor Weber and
Charles K. Strobel.

BY Albert J. Henderson

ATTORNEY.

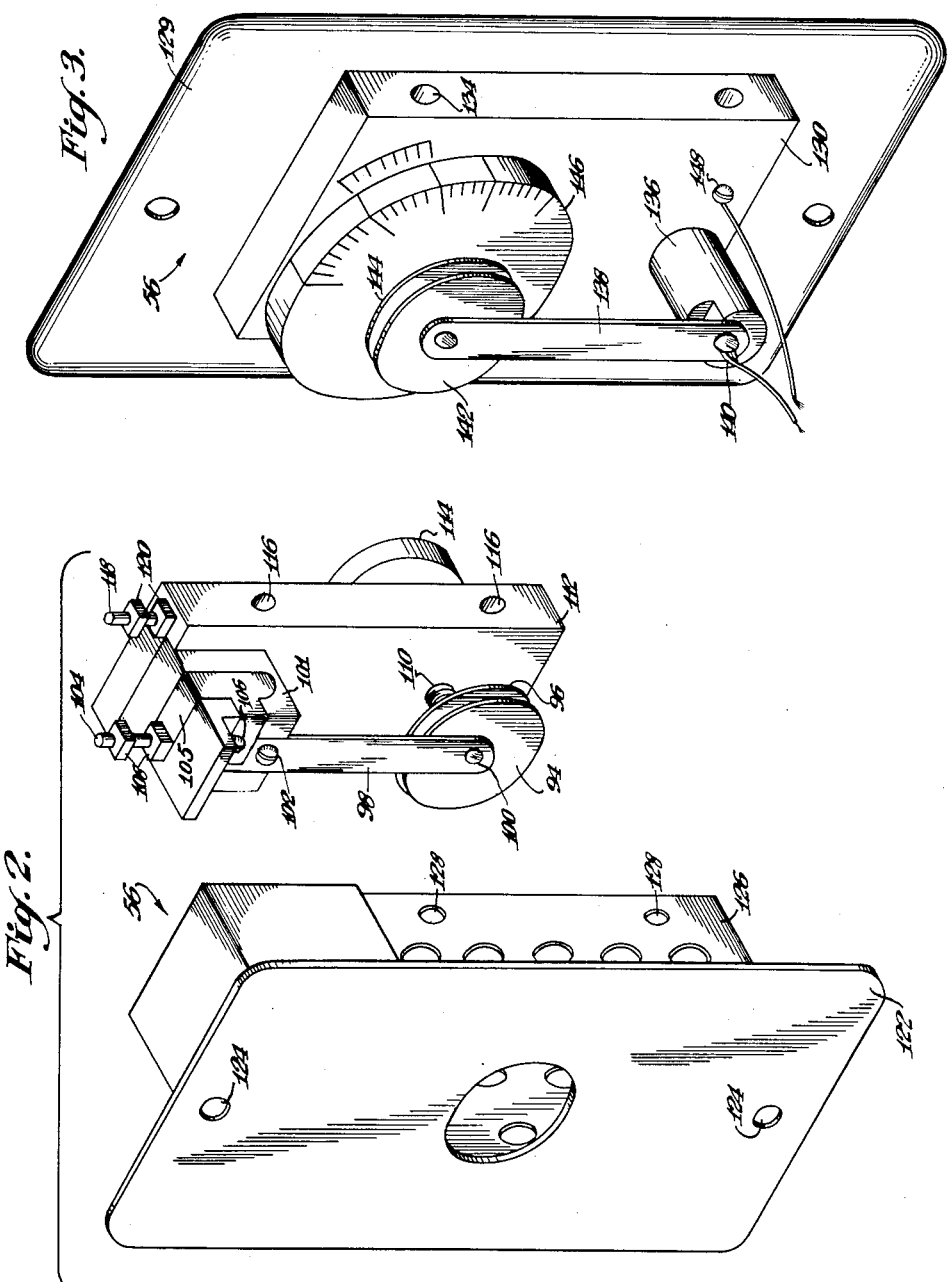

INVENTORS
Victor Weber and
Charles K. Strobel
BY
ATTORNEY

United States Patent Office 2,977,452
Patented Mar. 28, 1961

2,977,452
CAPACITANCE TYPE TEMPERATURE CONTROL

Victor Weber, Greensburg, and Charles K. Strobel, Pittsburgh, Pa., assignors to Robertshaw-Fulton Controls Company, Richmond, Va., a corporation of Delaware Filed Dec. 16, 1957, Ser. No. 702,954

7 Claims. (Cl. 219—20)

This invention relates to feedback control systems, and more particularly to circuitry and components for use in a system for automatically controlling temperature within an enclosure.

An object of this invention is to determine deviations in temperature from a predetermined value, and initiate correctional signals to restore the temperature to said value.

Another object of this invention is to detect deviations from a predetermined thermal datum level.

Other objects and advantages will become apparent from the following description of the drawings, in which:

Fig. 2 illustrates one embodiment of a condition responsive condenser of the invention;

Fig. 3 illustrates another embodiment of a condition responsive condenser of the invention.

Figure 1:
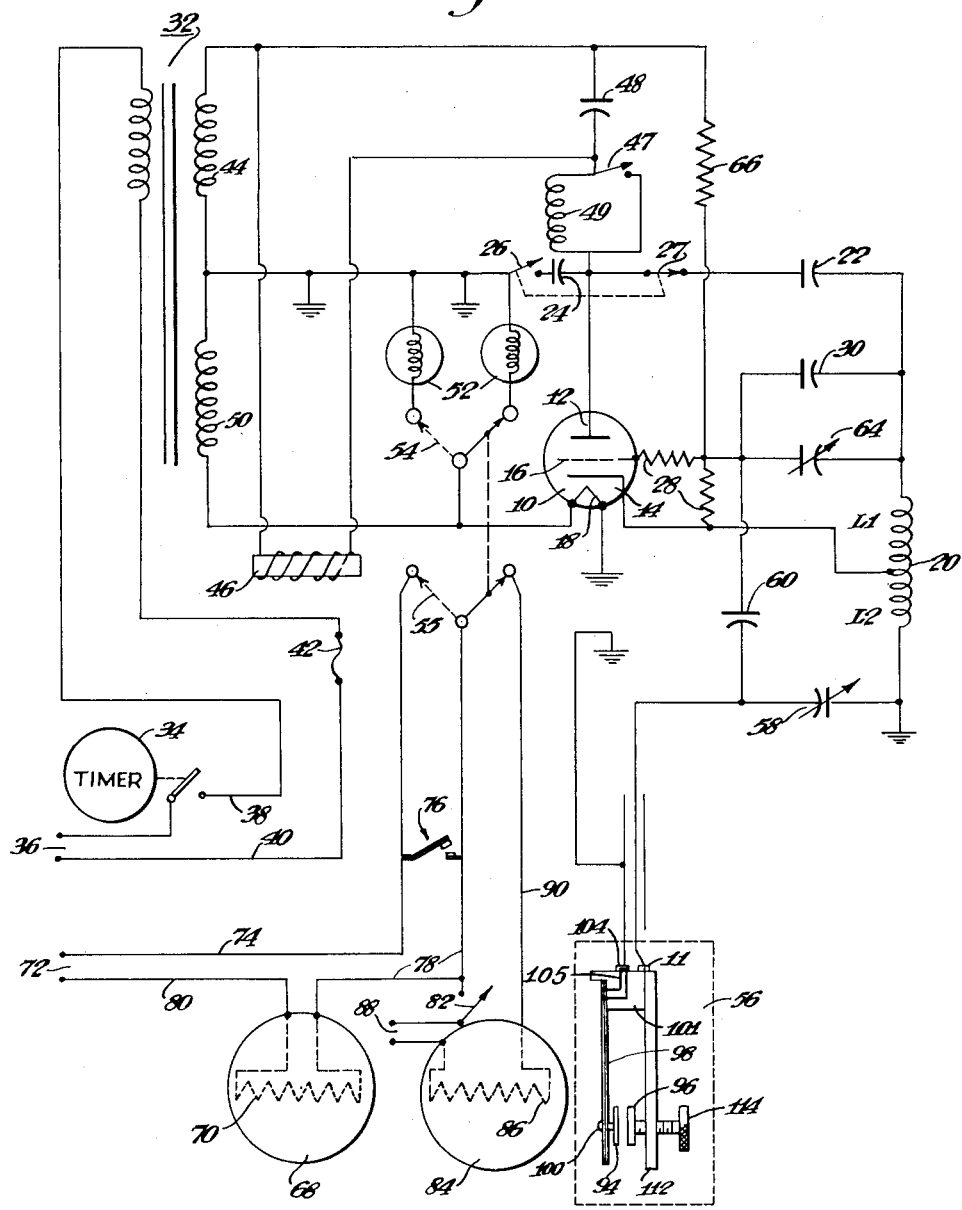
Fig. 1 shows diagrammatically the circuitry and components of the invention.

Referring more particularly to the drawings, a system embodying the invention includes an oscillator which comprises an electron discharge tube 10 provided with an anode 12, cathode 14, a control grid 16 and a cathode heater 18. Coupled to the electron discharge tube 10 is an oscillatory circuit including a center tapped coil 20, one end of which is connected in common with one plate of a capacitance 22. The opposite end of the coil 20 is grounded, and the opposite plate of capacitor 22 is connected to the anode 12 of the tube 10. The cathode 14 of tube 10 is connected to the center tap which divides the coil 20 into coil sections L1 and L2. Condenser 24 in the anode line of tube 10 is a condenser which may be grounded by means of a manually operable switch 26. The normally open switch 26 is ganged to a normally closed switch 27 shown immediately to the right thereof.

The cathode 14 of the triode tube 10 is maintained at an alternating current potential above ground. A tapped grid leak resistor 28 is provided, and this resistor is interconnected between the grid 16 and the cathode 14. A capacitor 30 is interconnected between the tap point on the grid leak resistor and ungrounded end of the coil 20.

Power is supplied to the system by a transformer 32 provided with a primary winding which is connected by means of a timer or clock actuated switch 34 to a source of alternating current suply voltage at 36. The input lines are identified by reference numerals 38 and 40 and may be provided with a fuse 42. The timer or clock actuated switch 34 may comprise any suitable means for energizing the primary winding of transformer for predetermined periods. The tapped terminal on the secondary winding 44 of transformer 32 is directly connected to ground, and the opposite terminal is connected to the anode 12 through the operating coil of a relay 46. A condenser 48 is connected in parallel with the operating coil of the relay 46. Between capacitor 48 and anode 12 there is provided a choke coil 49, for purposes to be explained more fully hereinafter. A switch 47 is utilized to connect a shunt around the choke coil 49. The secondary coil 50 of power transformer 32 provides voltage for the heating element 18. The lower end of this coil is connected directly to the cathode heater 18 which in turn completes the circuit to ground.

A pair of signal lights 52 are acted upon by relay 46 and are connected through a switch 54 to the voltage delivered by the secondary winding 50. Likewise, relay 46 acts on a switch 55 to move the same to a position shown in dashed lines on Fig. 1. The signal lights 52 are each provided with a connection directly to ground in order to provide a complete circuit for the energizing current. It will be observed that the movable arms of the switches 54 and 55 are physically interconnected for simultaneous movement.

The oscillations in the radio frequency capacity bridge shown to the right of tube 12 in Fig. 1 are controlled by a capacitiv network which includes a condition responsive condenser 56. It should be appreciated that the structural configuration of the condenser 56 comprises an essential part of the present invention which will be described in detail in connection with Figs. 2 and 3. One plate of condenser 56 is connected to ground and the opposite plate is connected to one plate of a vernier sensitivity control condenser 58 provided with a ground connection to the opposite plate. The vernier sensitivity control condenser 58 is connected in shunt across the condenser 56 in this manner in order to provide a ready calibrating means for the circuit. The condition responsive condenser 56 is an element having a capacitance which changes as a result of the variations in the spacing of electrodes occasioned by changes in the ambient temperature. Condensers 56 and 60 are connected in series with a variable condenser 64 which is connected to the ungrounded end of coil 20. Grid 16 of the tube 10 is connected to the junction between condensers 64 and 60 through tapped resistor 28. In this arrangement, the input circuit of the electron discharge tube 10 is connected as the detector branch of an electrical bridge in which parallel connected condensers 56, 58 in series with condenser 60 and the L2 portion of coil 20 form two arms of the bridge.

In like manner, the condenser 64 and the L1 portion of coil 20, connected in series, form the other two arms of the electrical bridge. Because of the fact that the control grid 16 and cathode 14 are connected across the condenser 64 and coil portion L1 section of the bridge, the tube 10 is able to equate the potential difference across these elements with that existing across the earlier mentioned arms of the bridge, and respond to differences therein.

With the oscillator as thus far described, oscillations will be sustained when the grid 16 is energized by a component of alternating voltage opposite in phase to the alternating voltage appearing at the anode 12. If the impedance ratio between the two halves of the coil 20, i.e., L1 and L2, is greater than the impedance ratio between the condensers 64, 60 plus 56 connected in parallel with 58, the grid 16 will be supplied with alternating potential of the proper phase to initiate and sustain oscillations. However, if the capacity of the condition responsive condenser 56 is increased or its impedance decreased, the amplitude of the alternating potential applied to the grid 16 will diminish and the amplitude of the oscillations will be decreased.

A gradual change in capacitance of the condenser 56 will change the amplitude of oscillation from zero to some maximum value which depends upon the characteristics of the tube 10. Such a change in capacitance of the condenser 56 will drive the grid 16 positive with respect to the cathode 14 and cause a grid current to flow. Such flow of grid current establishes a direct current bias across the grid leak resistor 28. This bias will reach an equilibrium level which will limit the amplification of the tube 10 so that a stable operating point will be reached.

Under conditions of zero oscillation, no bias is developed and the tube 10 will pass maximum plate current. However, under conditions of maximum oscillation, a maximum bias is correspondingly developed and the tube 10 passes minimum plate current. It will thus be apparent that by gradually increasing the feedback from zero to a maximum, the plate current may be progressively reduced from a maximum value to a minimum value.

In the operation of the system thus far described, it may be assumed that the transformer 32 is connected by the timer actuated switch 34 to a 60 cycle A.C. power supply, and that the value of capacitance provided by condenser 56 is substantially smaller than that of variable condenser 64. Under these conditions the tube 10 will oscillate during positive half cycles reaching maximum amplitude at the peak positive half-waves of the source frequency. This amplitude of oscillation is, of course, controlled by the gain of the tube.

The self bias which is generated by the self-rectification of the grid and developed across the grid leak resistor 28 is reduced because of the increased capacitance provided by condenser 56. Such reduction occurs since the amount of feedback is reduced as a result of the decrease in the impedance ratio between the condenser 64 and the condensers 56 and 60. As the capacitance of condenser 56 is reduced still further, the amount of feedback potential is correspondingly reduced until there is insufficient feedback of the proper phase to sustain oscillation. The change in the capacitance of condenser 56 required to vary the circuit from zero to maximum amplitude of oscillation is progressive. In addition to the progressive change in the amplitude of oscillation which occurs in this manner, it should be appreciated that the plate current of the tube also changes from minimum to maximum value. At the point of maximum or near maximum anode current, the relay 46 shown to the left of Fig. 1 is energized.

It is a well-known characteristic of electrical relays that a larger current is required to move the armature to attracted position than is necessary to hold the armature in such position. Thus, if a capacity sensitive relay is to operate between its "pull in" and "drop out" positions in response to small changes in the capacity of a condenser, such as the condenser 56, the initial variation in plate current must be relatively large as compared with the capacitance variation of such a condenser. It is thus desirable that there be a snap action transition in tube 10 when the associated circuitry changes from an oscillating to a non-oscillating state and vice versa. Such a snap action transition eliminates for all practical purposes the effect of the slowly changing capacitance in the condition responsive condenser 56 and makes the oscillator circuit extremely sensitive around the operating point.

To accomplish such result in the present invention, means are provided for applying a positive bias to the grid 16 during the positive half-cycles applied tube 10 by the power supply. More particularly, the secondary winding 44 of the transformer 32 is connected to the grid 16 through a resistance 66. With such an arrangement, the variations in the capacitance of condenser 56 which produce alternating potential of the correct phase to initiate oscillation, result in substantially instantaneous increases in the amplitude of oscillation from minimum to maximum. These increases cause an instantaneous change in plate current of sufficient magnitude to operate the relay 46. When the capacitance of condenser 56 is reduced below the value wherein the alternating potential fed to the grid 16 is of such phase to terminate oscillation, an instantaneous reduction in plate current results and the relay 46 is deenergized.

The advantage of thus including an additional grid potential in phase with the plate voltage is to enable the tube 10 to become more conductive than would otherwise be the case, which allows an instantaneous change of state from oscillating to non-oscillating or vice versa in response to very small changes of grid potential received from the oscillating bridge circuit. Hence, it can now be appreciated that with small changes in the value of capacitance of condenser 56 at the critical point, the change in feedback is capable of snapping the tube into oscillating or non-oscillating condition whereby maximum or minimum current in the plate circuit is attained substantially instantaneously.

A space heater 68 is provided with an electrical resistance element 70 shown in dashed lines. The heater 68 is connected to receive conventional power frequency voltage across a pair of terminals 72. Although the space heater 68 is shown as comprising a resistance element, it will be appreciated that other sources of radiant heat energy may be employed, such as a gas or oil combustion system.

Two alternate methods of supplying power to the space heater 68 may be employed. Thus, a circuit may be traced from a source of current through conductor 74, bimetallic switch 76, conductor 78, resistance element 70 and conductor 80. It will be appreciated that the switch 76 may comprise any suitable type of adjustable bimetallic switch capable of operation at a predetermined temperature. With this mode of operation, the delivery of heat energy by the spacer heater is completely controlled by the switch 76, and the condition responsive condenser 56 is rendered ineffective to control the temperature of the area in question.

This mode of operation is particularly desirable where the condition responsive condenser 56 is relied upon to hold the daytime temperature of a dwelling within close limits, and the bimetallic switch 76 is set to hold a substantially cooler nighttime temperature. For instance, the automatic removal of power from the oscillator circuitry at the end of a day, by means of the timer actuated switch 34 may be employed to place the temperature within the enclosure under the control of the switch 76. For purposes of this invention, this method of operating the system will be defined as high-level fail safe operation. Thus, the relay 46 in Fig. 1 is energized when the ambient temperature causes the capacitance of condition responsive condenser 56 to diminish below the value required to "null" the bridge circuit.

During intervals when the oscillator circuitry is energized from the power supply due to the action of the timer actuated switch 34, a second method of supplying power to the space heater is employed. Under these conditions, the movable member of switch 55 is periodically caused to occupy the position shown by the dashed lines. This displacement is, of course, caused by the actuation of relay 46 effected by thermally responsive variations in the condition responsive condenser 56.

When the movable member of switch 55 is caused to occupy the position shown by the dashed lines, a circuit may be traced as follows: conductor 74, switch 55, conductor 78, resistance element 70 and conductor 80. It should be appreciated in this connection that the use of the system without the timer-actuated switch 34 would be deemed to fall well within the purview of the invention disclosed and claimed herein.

In the alternative method of accomplishing the result sought and in order to provide low-level fail safe operation, use of a space heater 84 shown in the lower left-hand portion of Fig. 1 is made. In this type of operation, the relay 46 is energized when the ambient temperature causes the capacitance of condenser 56 to exceed the value required to "null" the bridge circuit. The space heater 84 is provided with an electrical resistance element 86 as shown by the dashed lines. The space heater 84 is connected to receive conventional power frequency voltage across a pair of terminals 88. One of the terminals is connected to the conductor 78 and movable arm of switch 55 by means of a manually operable switch 82. The opposite terminal is connected in series with the resistance element 86 and a conductor 90 which terminates at the switch 55.

To obtain low-level fail safe operation with the space heater 84, the switch 47 in the upper portion of the drawing is closed to provide a conductive shunt path around the choke coil 49. Then, the switch 26 is closed in order to place capacitor 24 in circuit. This has the effect of simultaneously opening switch 27 and removing capacitor 22 from the oscillator circuit. The manually operable switch 82 may then be closed. Under these conditions, the switch 55 will act to interconnect conductors 78 and 90 for thermally affected decreases in the capacitance offered by the condition responsive condenser 56. The movable member of the switch 55 will similarly disconnect the conductors 78 and 90 as a result of increases in the capacitance of the unit 56. With this mode of operation, power is received directly by the space heater without the use of any timer actuated switch, or the like, and nighttime low temperature control may be effected by manually varying the control temperature of the condition responsive condenser.

In Fig. 2, one embodiment of the condition responsive condenser 56 is shown in exploded view. The condenser 56 includes a pair of plates 94 and 96 separated by an air dielectric. The plates 94 and 96 may take the form of discs fabricated from a suitable metal such as aluminum or the like. The plate 94 forms the movable plate of the condenser, and is caused to assume a variable spacing with respect to normally fixed plate 96 as a result of changes in the ambient temperature of the air.

The movement of the plate 94 is effected by means of a bimetallic strip 98 which is secured at one end to the plate 94 by a screw 100 or other equally suitable means. The opposite end of the strip 98 is secured to an insulating block 101 by means of a screw 102 or other suitable fastening means. The strip 98 may be fabricated of a piece of compound stock of the type known commercially as Wilco "Morflex." The insulating block 101 may be formed of a phenolic condensation product such as Bakelite, or other suitable non-conducting material.

The block 101 is provided with a threaded terminal stud 104 for the condenser plate 94. The stud 104 is embedded within the block 101 and by means of a metallic conductor strip 105, which is suitably bent around block 101, is connected with bimetal strip 98 through terminal screw 106. The terminal stud 104 is also provided with suitable lock nuts 108 for securing conductive electrical leads thereto. The normally stationary plate 96 in the condition responsive condenser 56 is secured to a threaded rod 110. The rod 110 threadedly engages the metallic support block 112, and terminates in a dial 114 on the opposite side thereof. One revolution of the dial 114 is provided for settings in the range from 60° F. to 100° F., with proper proportioning of the component capacitances 30 and 64 in the capacitance bridge circuit of Fig. 1.

The block 112 may be fabricated of aluminum or other equally suitable conductive material, and provided with laterally disposed threaded holes 116 therein. The upper portion of the metallic block 112 is provided with a threaded terminal stud 118. The stud 118 is equipped with suitable lock nuts 120 for securing electrical leads thereto.

A coverplate assembly which includes a plate 122 is provided with longitudinally centered screwholes 124 therein. A perforated cover member 126 is securtd to the underside of the plate 122. It will be appreciated that the assembly illustrated in the righthand portion of Fig. 2 telescopes, or nests, within the cover member 126. Then, the holes 116 in block 112 are brought into registry with the holes 128 provided in the cover member and suitable retaining screws are placed in threaded engagement therethrough. It will also be appreciated that the assembly illustrated in Fig. 2 may readily be mounted in a standard recessed switch outlet box by using the centered screwholes 124 in the plate 122.

In Fig. 3, another embodiment of the invention is shown comprising a plate 129 of the proper size and dimension to engage a standard recessed switch outlet box. A metallic support block 130 is secured to the plate 129. The support block 130 is provided with laterally disposed threaded holes 134 therewithin. It will be appreciated that the assembly is housed within a perforated cover box assembly provided with holes which register with the holes 134, and that conventional screws are employed to secure the block 130 within the cover box assembly. The lower portion of the block 130 is provided with an insulating post 136, to which there is secured a bimetallic strip 138 by means of screw 140. The strip 138 may be formed from material known commercially as Wilco "Morflex."

The opposite end of the strip 138 is secured to a circular plate 142 which forms one plate of the condition responsive condenser. A second plate 144 is mounted in spaced relationship to the plate 142. The plate 144 is securely affixed to a dial 146 of fiber or other suitable material which is secured to a threaded rod (not shown) which engages the support block 130. This threaded rod is rotatably disposed with respect to the block 130 in order to permit relative movement of the dial 146 with respect to the plate 142.

In the embodiment shown in Fig. 3, it will be observed that the bimetallic strip 138 extends upwardly, and that the dial 146 is contained within the recessed switch outlet box, rather than externally thereof as shown in Fig. 2. Electrical communication with the plates of the condenser 56 is maintained by means of screws 140 and 148 which conductively contact the bimetallic strip 138 and the support block 130, respectively.

In practicing the invention, it has been found that relatively lower temperatures, such as 59° F., can be maintained within an enclosure with an accuracy of one-fourth of a degree. Relatively higher temperatures, such as 94° F., have also been readily maintained within the same degree of accuracy.

The above described invention may be modified to compensate for outdoor temperature variations and indoor humidity variations. In one instance, a second temperature sensing unit, mounted outside of the building is connected in parallel with the indoor temperature sensing unit so that a lower outdoor temperature will require a higher indoor temperature for operation of the switching means at a given temperature dial setting of the indoor unit. In this modification, a humidity sensing element is connected in parallel with the temperature sensing capacitance unit within the building, so that any increase in capacitance caused by increased humidity requires a lower indoor temperature for operation of the switching means at a given temperature dial setting of the indoor unit.

Figure 4:
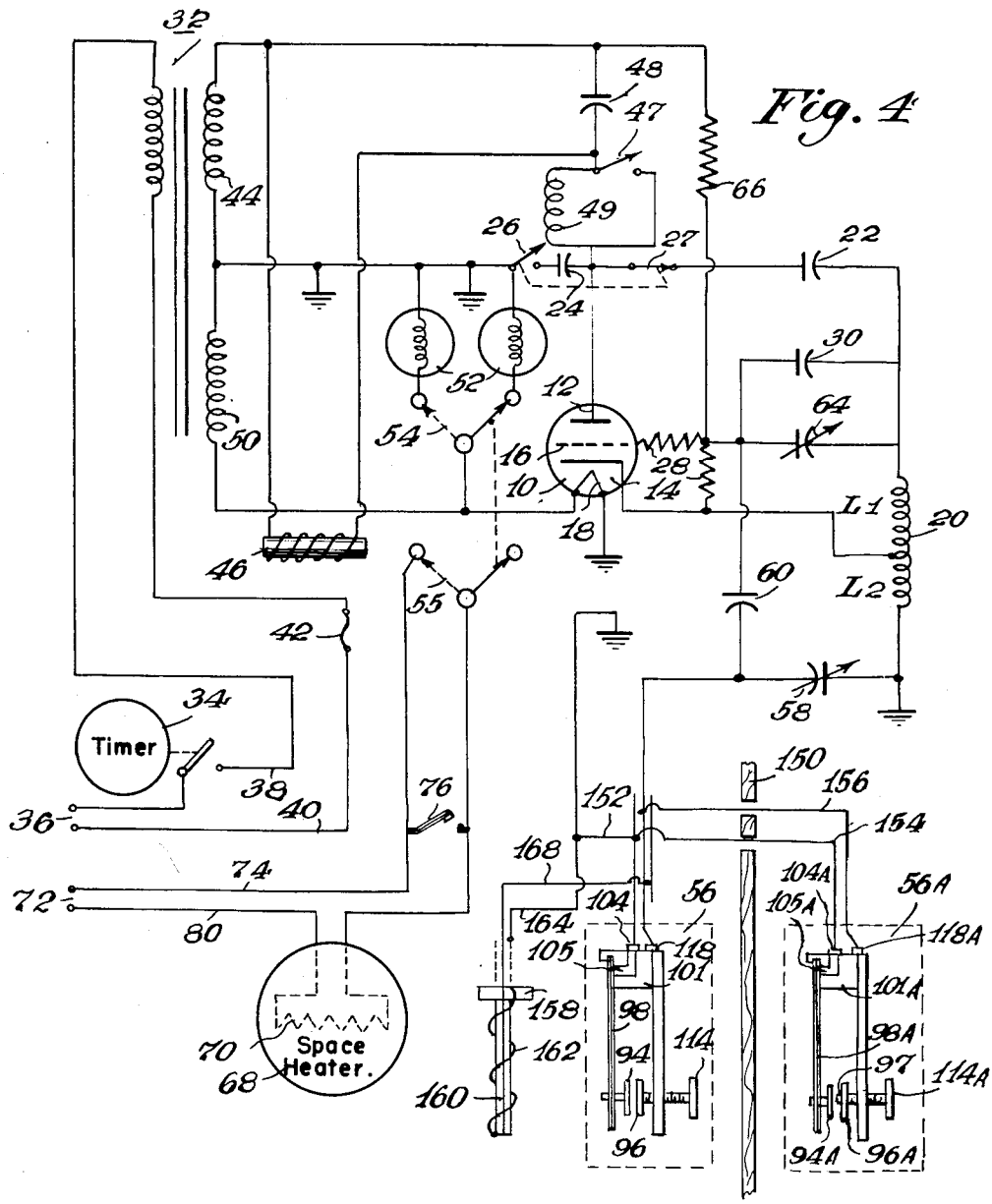
Fig. 4 illustrates another embodiment of the invention.

Referring more particularly to Fig. 4, the circuitry and components for taking account of external temperature variations and internal humidity variations are shown in detail.

It should be appreciated that the system shown in Fig. 4 comprises a modification of the portion of the circuit in Fig. 1 which is relied upon for "high level fail safe" operation, as earlier defined in this patent specification. For this reason, the space heater 84 and the associated circuitry employed in "low level fail safe" operation have been omitted from the drawing in order to enhance the clarity of the description.

In Fig. 4, a condition responsive condenser 56 is connected internally of the outer wall 150 of a dwelling or commercial building. The stud 104 which electrically contacts the movable plate 94 by means of metallic connector strip 105 is connected to ground, via conductor 152. The opposite plate of the condenser 56 is coupled to one plate of the variable condensers 58 and 60.

Externally of the outer wall 150, there is provided a condition responsive condenser 56A. The condenser 56A may be structurally similar to the condenser 56 mounted internally of wall 50, except for a deliberately decreased sensitivity with respect thereto. In other words, the change in capacitance which occurs in condenser 56A in response to unit change in temperature, say 1° F., is somewhat less than that experienced by the condenser 56. As will be appreciated by those skilled in the art, the use of slightly different materials or dimensions for the bimetallic strip 98A within condenser 56A can provide any desired degree of sensitivity with respect to the condenser 56. The condenser 56A is provided with an insulated stop member 97, which is affixed to the plate 96A. Because of the member 97, the condenser 56A acts as a fixed capacitance in relatively warm weather, and is capable of varying the indoor temperature only when the outdoor temperature has been reduced below a predetermined value.

The terminal stud 104A provided in condenser 56A is connected in common with the stud 104 of condenser 56, by means of conductor 154. Conversely, the stud 118A which provides electrical ingress to condenser plate 96A is connected in common to one plate of the variable condensers 58 and 60 shown immediately thereabove, via conductor 156.

On the internal side of the outer wall 150, a humidity sensing element 158 is connected to further modify the influence of the condition responsive condenser 56 on the oscillator circuitry associated with the tube 10.

The sensing element 158 may comprise any suitable type of humidity responsive capacitor. For instance, the element 158 may consist of a short length of cotton covered enameled copper wire 160 encircled with a plurality of convolutions of relatively fine enameled copper wire 162 as disclosed and claimed in U.S. patent application Serial No. 661,923, filed on May 27, 1957 and assigned to the assignee of the present application. It should be appreciated that the scope of the appended claims is not to be limited by the specific structural configuration employed for the humidity sensing element 158.

The element 158 is connected in parallel with the condenser 56. More particularly, the convolutions of fine enameled copper wire 162 are connected to the grounded stud 104, via conductor 164 and the interior wire portion 160 is coupled to one plate of condenser 64, via conductor 168.

In operation, decreases in outdoor temperature cause the plates 94A and 96A to separate. This has the effect of reducing by a small amount the net capacitance connected in parallel across the plates of capacitor 64. As a result, a small quantity of heat is required in the vicinity of the indoor capacitor 56 in order to properly compensate its individual capacitance for the reduction in the net capacitance caused by the influence of the external temperature on the unit 56A.

Because of this mode of operation, the indoor control temperature for a given temperature setting is somewhat higher during relatively cold weather, and somewhat lower during relatively warm weather than would be the case without the outdoor unit 56A connected. It should be appreciated in this connection that the outdoor unit acts as a fixed capacitance in relatively warm weather because of the stop member 97A, and is effective in raising the indoor temperature only when the outdoor temperature has dropped below a predetermined value.

When the indoor humidity rises, the capacitance of the humidity sensing element 158 similarly increases, which effects an increase in the total capacitance sampled by the A.C. bridge circuit associated with the tube 10.

As a result, the indoor temperature is forced to drop slightly in order to effect a compensating increase in the spacing between the plates 94, 96 of the indoor unit 56. The net effect of this sequence is to provide a small reduction in the indoor temperature whenever the indoor humidity increases. It will thus be seen that the embodiment of the invention shown in Fig. 4 is capable of slightly moderating the indoor temperature to take account of both indoor humidity and outdoor temperature variations.

It will be apparent to those skilled in the art that many modifications of the disclosed embodiments of this invention may be made without departing from the scope thereof which is to be measured by the appended claims.

We claim:

1. In a system for controlling the operation of a heating means in accordance with the temperature of an enclosure heated by said heating means, the combination comprising switch means movable between open and closed positions for controlling the operation of the heating means, relay means operably connected for moving said switch means between positions in response to energization of said relay means, oscillator means operably connected for controlling energization of said relay means in accordance with the amplitude of oscillation of said oscillator means, and capacitive means operably connected for controlling the condition of said oscillator means in response to the temperature of the enclosure, said oscillator means shifting instantaneously between a condition of maximum amplitude of oscillation and a condition of minimum amplitude of oscillation in response to changes of said capacitive means about a predetermined value.

2. In a system for controlling the operation of a heating means in accordance with the temperature of an enclosure heated by said heating means, the combination comprising switch means movable between an open position and a closed position for controlling the operation of the heating means, relay means operably connected for moving said switch means between positions, oscillator means operably connected to control energization of said relay means in accordance with the amplitude of oscillation of said oscillator means, and capacitive means operably connected for controlling the condition of said oscillator means in response to the temperature of the enclosure, said capacitive means being adjustable for varying the temperature to be maintained in the enclosure, said oscillator means shifting instantaneously between a condition of maximum amplitude of oscillation and a condition of minimum amplitude of oscillation in response to changes of said capacitive means about a predetermined value.

3. In a system for controlling the temperature of an enclosure heated by electrically operable heating means, the combination comprising an oscillator circuit including an anode, a cathode, a grid, and a tank circuit, a capacitor operatively connected to said tank circuit and being operable in response to the temperature of the enclosure for varying current flowing through said anode, relay means operably connected to said anode and including first switch means operably connected for controlling the flow of current to the heating means, timer means operably connected to control the flow of current to said oscillator circuit, and second switch means connected in parallel with said first switch means for supplying current to the heating means in response to the temperature of the enclosure when said first switch means is open.

4. In a system for controlling the temperature of an enclosure heated by electrically operable heating means, the combination comprising an oscillator circuit including an anode, a cathode, a grid, and a tank circuit, a capacitor operatively connected to said tank circuit and being operable in response to the temperature of the enclosure for varying current flowing through said anode, relay means operably connected to said anode and including first switch means operably connected for controlling the flow of current to the heating means, timer means operably connected to said oscillator circuit to allow current to flow through said anode only during predetermined periods, and switch means connected in parallel with said first switch means for supplying current to said heating means in response to the temperature of the enclosure during periods other than said predetermined periods.

5. In a system for controlling the temperature of an enclosure heated by electrically operable heating means, the combination comprising an oscillator circuit including an anode, a cathode, and a grid, a bridge circuit operably connected for controlling a flow of current through said anode and including a capacitor operable in response to the temperature of the enclosure for varying current flowing through said anode, said capacitor being adjustable for varying the temperature to be maintained in the enclosure, relay means operably connected to said anode and including first switch means operably connected for controlling the flow of current to the heating means, timer switch means operably connected to allow current to flow through said anode only during predetermined periods, and bimetallic switch means connected in parallel with said first switch means, said bimetallic switch means being operable to supply current to said heating means when the temperature is below that set by said capacitor and only during times other than said predetermined periods.

6. In a system for controlling the temperature of an enclosure heated by electrically operable heating means, the combination comprising an oscillator circuit including an anode, a cathode, a grid, and a tank circuit, relay means operably connected to said anode and including first switch means operably connected for controlling the flow of current to the heating means, timer means operably connected to control the flow of current to said oscillator circuit, a bridge circuit operably connected to control the flow of current through said anode and including a first condenser operably connected to control the flow of current through said anode in response to the temperature of the enclosure, a humidity responsive capacitive element connected in parallel with said first condenser, and a second temperature responsive condenser connected to affect the electrical balance within said bridge circuit in response to temperatures external to the enclosure.

7. In a system for controlling the operation of a heating means in accordance with the temperature of an enclosure heated by said heating means, the combination comprising a first control means including an oscillator means having an output current, capacitive means responsive to the temperature of said enclosure and operably connected to said oscillator means to vary the magnitude of said output current, relay means responsive to said output current having first switch means operably connected to control the operation of said heating means; timer means connected to said first control means to periodically terminate the use of said first control means to control operation of said heating means; and a second control means including a second switch means responsive to the temperature of said enclosure for controlling the operation of said heating means when use of said first control means is terminated by said timer means.

References Cited in the file of this patent

UNITED STATES PATENTS

| | | |
|---|---|---|
| 1,869,161 | Merrill | July 26, 1932 |
| 2,017,859 | Halstead | Oct. 22, 1935 |
| 2,171,655 | Johnson | Sept. 5, 1939 |
| 2,220,061 | Brown | Nov. 5, 1940 |
| 2,236,624 | Litwin | Apr. 1, 1941 |
| 2,240,390 | Chappell | Apr. 29, 1941 |
| 2,303,654 | Newton | Dec. 1, 1942 |
| 2,403,917 | Gille | July 16, 1946 |
| 2,412,782 | Palmer | Dec. 17, 1946 |
| 2,453,584 | Newton | Nov. 9, 1948 |
| 2,476,496 | Kliever | July 19, 1949 |
| 2,505,565 | Michel et al. | Apr. 25, 1950 |
| 2,576,371 | Thompson | Nov. 27, 1951 |
| 2,632,086 | Hagen | Mar. 17, 1953 |
| 2,659,801 | Collins | Nov. 17, 1953 |
| 2,718,617 | Connor | Sept. 20, 1955 |
| 2,819,371 | Aldrich et al. | Jan. 7, 1958 |